United States Patent
Nishikawa et al.

(10) Patent No.: US 9,363,196 B2
(45) Date of Patent: Jun. 7, 2016

(54) ULTRA LOW POWER-DATA DRIVEN NETWORKING PROCESSING DEVICE FOR AVOIDING OVERLOAD

(75) Inventors: Hiroaki Nishikawa, Tsukuba (JP); Shuji Sannomiya, Tsukuba (JP); Makoto Iwata, Kami (JP); Hiroshi Ishii, Tokyo (JP); Keisuke Utsu, Tokyo (JP)

(73) Assignees: University of Tsukuba, Ibaraki (JP); Kochi University of Technology, Kochi (JP); Tokai University, Tokyo (JP)

( * ) Notice: Subject to any disclaimer, the term of this patent is extended or adjusted under 35 U.S.C. 154(b) by 203 days.

(21) Appl. No.: 14/232,951

(22) PCT Filed: Jul. 9, 2012

(86) PCT No.: PCT/JP2012/004420
§ 371 (c)(1),
(2), (4) Date: Mar. 20, 2014

(87) PCT Pub. No.: WO2013/011653
PCT Pub. Date: Jan. 24, 2013

(65) Prior Publication Data
US 2014/0219084 A1   Aug. 7, 2014

(30) Foreign Application Priority Data
Jul. 15, 2011 (JP) ................................. 2011-157238

(51) Int. Cl.
*H04L 12/911* (2013.01)
*G06F 1/28* (2006.01)
(Continued)

(52) U.S. Cl.
CPC ............... *H04L 47/745* (2013.01); *G06F 1/28* (2013.01); *G06F 1/3296* (2013.01); *H04L 47/122* (2013.01); *Y02B 60/1285* (2013.01)

(58) Field of Classification Search
None
See application file for complete search history.

(56) References Cited

U.S. PATENT DOCUMENTS

| 6,526,500 | B1 * | 2/2003 | Yumoto | G06F 15/82 709/239 |
| 2005/0076188 | A1 * | 4/2005 | Nishikawa | G06F 9/3836 712/27 |

(Continued)

FOREIGN PATENT DOCUMENTS

| JP | 2004-13602 | 1/2004 |
| JP | 2005-108086 | 4/2005 |

(Continued)

OTHER PUBLICATIONS

PCT/JP2012/004420 International File Date: Jul. 9, 2012—International Search Report; University of Tsukuba et al.; 1 pages.

*Primary Examiner* — Noel Beharry
*Assistant Examiner* — Wilfred Thomas
(74) *Attorney, Agent, or Firm* — Sunstone IP (57) ABSTRACT

The present invention is provided with: a data-driven processor comprising at least a firing control which determines whether or not firing conditions have been met by determining whether or not all packets necessary for instruction execution have been received when a packet that convey a part of partitioned data to be processed has been input, and a data processing unit for performing processing corresponding to the packets transmitted from the firing control if the firing conditions have been met; a power supply circuit for supplying power to the data-driven processor; and overload avoidance means for refusing input of the packets to the data-driven processor, if a determination has been made that a data processing load in the data-driven processor may reach an overloaded state in which the data processing may stall, on the basis of current consumption in the data-driven processor. Accordingly, power consumption in a networking system is reduced.

5 Claims, 6 Drawing Sheets

(51) Int. Cl.
*G06F 1/32* (2006.01)
*H04L 12/803* (2013.01)

(56) References Cited

U.S. PATENT DOCUMENTS

| | | | |
|---|---|---|---|
| 2005/0102490 A1* | 5/2005 | Itoh | G06F 9/4436 712/25 |
| 2007/0049133 A1* | 3/2007 | Conroy | G06F 1/26 439/894 |
| 2007/0139838 A1* | 6/2007 | Huang | G06F 1/305 361/93.1 |
| 2008/0288796 A1* | 11/2008 | Nakamura | G06F 1/32 713/320 |
| 2010/0146316 A1* | 6/2010 | Carter | G06F 1/3203 713/322 |

FOREIGN PATENT DOCUMENTS

| JP | 2010-20598 | 1/2010 |
|---|---|---|
| JP | 2011-30210 | 2/2011 |

* cited by examiner

| ISS | | | | | | |
|---|---|---|---|---|---|---|
| | 0~α1 | | α1~α2 | | ...... | α n-1~α n | |
| | POWER SAVING PRIORITY | SPEED PRIORITY | POWER SAVING PRIORITY | SPEED PRIORITY | ...... | POWER SAVING PRIORITY | SPEED PRIORITY |
| Vdd | $V_1$ | $V_1'$ | $V_2$ | $V_2'$ | ...... | $V_n$ | $V_n'$ |

Fig. 6

ULTRA LOW POWER-DATA DRIVEN NETWORKING PROCESSING DEVICE FOR AVOIDING OVERLOAD

CROSS-REFERENCE TO RELATED APPLICATIONS

This application claims priority to PCT Application No. PCT/JP2012/004420, having a filing date of Jul. 9, 2012, the entire contents of which are hereby incorporated by reference.

FIELD OF TECHNOLOGY

The present invention relates to an ultra-low-power data-driven networking processing device for avoiding an overload, which uses a data-driven processor.

BACKGROUND

In a conventional computer, data-driven processors capable of performing parallel processing without causing overhead have been developed. The aforementioned data-driven processor is designed based on data-driven principles that enable each instruction in a program to be executed at time at which all pieces of its required input data are prepared. As technology using such data-driven principles, technologies disclosed in the following Patent documents 1 and 2 are known in the prior art.

Patent document 1 (Japanese Patent Application Publication No. 2004-13602) discloses a configuration in which a data-driven processor has a plurality of processing elements (PE's), and packets that convey partitioned data are input to the respective processing elements (PE's). In the configuration described in Patent document 1, a processing element (PE) includes a firing control unit (FC), a functional processor unit (FP), a program storage unit (PS), etc., and the firing control unit (FC) is able to determine whether all packets required to execute an instruction have been prepared based on input packets. If all packets have been prepared, firing conditions are considered to be satisfied, the packets from the firing control unit (FC) are transmitted to the functional processor unit (FP) to perform an operation, and packets having the results of the operation are transmitted to the program storage unit (PS). In compliance with the transmitted packets and a new instruction designated in instruction memory (IM), the program storage unit (PS) generates packets based on the new instruction and transmits the packets to another processing element (PE) which is a designated destination.

Further, Patent document 1 describes that each processing element (PE) has a super-pipeline structure based on a self-timed elastic pipeline. That is, the respective function blocks of the firing control unit (FC), the functional processor unit (FP), and the program storage unit (PS) which are in the processing element (PE), are configured in multiple pipeline stages. Further, each pipeline stage is provided with a data latch (DL) for maintaining packets, a logic circuit (LC) for processing the maintained packets, and a self-timed transfer control mechanism (STCM) for providing a synchronization signal (clock signal and trigger signal) to the data latch. Further, in each pipeline stage, transmission timing of packets is autonomously determined depending on the states of upstream and downstream pipeline stages (data is empty or being processed) in a packet flow.

Patent document 2 (Japanese Patent Application Publication No. 2005-108086) discloses technology relating to a data-driven processor. An invention described in Patent document 2 discloses a configuration in which each processing element (PE) connected via a first switch (SW1) can process data-driven packets processed in parallel in compliance with instructions issued based on the data dependencies among them and control-driven packets sequentially processed in compliance with instructions sequentially issued based on a program counter, in the same pipeline.

Each processing element (PE) described in Patent document 2 has an instruction fetch unit (IF) for fetching an instruction based on input packets, an instruction decode unit (ID) for decoding the instruction fetched and issued by the instruction fetch unit (IF), a second switch (SW2) for causing the instruction output from the instruction decode unit (ID) to branch, a firing control unit (FC) for determining firing conditions based on the packets transmitted from the second switch SW2, an execution unit (EX) for executing the instruction (calculation of values, reading/writing from/to memory, calculation of addresses or branch destinations, etc.) based on the packets transmitted from the firing control unit (FC) if the firing conditions are satisfied, and a write back unit (WB) for, if the instruction processed by the execution unit (EX) is a control-driven instruction for branch calculation or the like, performing writing to a register (REG).

Patent document 3 (Japanese Patent Application Publication No. 2010-20598) discloses the use of autonomous decentralized communication network (ad hoc network) and data-driven processor so as to reduce power consumption in a networking system, in addition, the technology that controlling the supply of power to pipeline stages such that, when neither processing nor data latching (data maintenance) are performed in a downstream pipeline stage, the supply of power is stopped, and when processing is not performed and only data latching is performed in a downstream pipeline stage, only a minimum voltage is applied.

Patent document 4 (Japanese Patent Application Publication No. 2011-30210) discloses technology for counting the number of transmission-waiting packets corresponding to a transmission queue, setting a probability that a message will be relayed by comparing the number of transmission-waiting packets with a threshold value, and setting a waiting time required to wait for relay based on the results of the comparison, then processing relay based on the set probability and waiting time, in order to check the load state of the node and perform a flooding function enabling the relay of data to be efficiently executed, for each node constituting the network.

SUMMARY

Technical Problem

In the invention described in Patent documents 1 and 2 or other conventional inventions, research and development have been conducted to focus on the high-speed execution of information processing and research and development based on low-power consumption have been insufficiently conducted. That is, in the past, a low-power consumption waiting state was provided in a processor embedded in a terminal, and the reduction of power consumption was merely promoted by causing the processor to be in the waiting state when the transmission/reception of packets was not performed and by blocking the supply of power to unused circuit blocks. However, since a return from the waiting state to an operating state is performed by interrupt handling, overhead for the return occurs, and when switching between the waiting state and the operating state occurs frequently, it has a limited effect on reducing power consumption.

Further, technology disclosed in Patent document 3 promotes low-power consumption by controlling the supply of power depending on the state of processing or data latching, i.e. the state of a processing load, in each pipeline stage. For example, in an overload state such as a situation in which packets are successively received while processing is being performed in all or most pipeline stages, an unnecessary waiting time is caused until completing the processing, and thus a problem arises in that processing time is lengthened and the effect of reducing power consumption is also limited.

Furthermore, technology described in Patent document 4 controls the relay of a message depending on the state of a processing load in each node, thus suppressing the amount of information (traffic) flowing through the overall network and the overload state of the network. However, since technology described in Patent document 4 uses the number of transmission-waiting packets as a reference so as to check the load, and needs to cause packets to wait for relay in consideration of a predetermined safety factor (margin) when the load fluctuates according to the type or length of packets, there is a limited effect on reducing power consumption, if power is converted into power consumption per unit information amount when relay is excessively suppressed.

Further, since conventional technology described in Patent Documents 1 to 4 performs queuing to receive and store packets which are transmitted to the processor and cause the packets to wait for processing, power for queuing is also required.

Specifically, when a telephone line is disconnected or when a large-scale power failure occurs and communication infrastructures such as radio repeaters or base stations are unavailable, as in case of a disaster such as an earthquake, it is required to construct an ad hoc network enabling terminals driven using batteries such as mobile phones to transmit and receive data among them, and allow the ad hoc network to function as a communication network by transmitting/receiving, relaying, and transferring (relaying) required information. For example, it is preferable that information such as emergency earthquake-related breaking news or tsunami information be received by as many terminals as possible even when communication infrastructures are unavailable. In this case, if power consumption is high, that is, if the battery power of terminals is greatly consumed or exhausted, the number of nodes constituting the ad hoc network is decreased, and the terminals for transmitting information are limited, and thus it is preferable to minimize power consumption if possible.

A technical object of the present invention is to reduce the power consumption of a networking system.

Technical Solution

In order to accomplish the above object, an ultra-low-power data-driven networking processing device for avoiding overload according to the present invention described in claim 1 includes a data-driven processor including at least a firing control unit for determines whether firing conditions have been satisfied by determining whether all packets required to execute an instruction have been received, with respect to packets that convey partitioned data to be processed, and a data processing unit for performing processing based on packets transmitted from the firing control unit if the firing conditions have been satisfied; a power circuit for supplying power to the data-driven processor; and an overload avoidance means for denying input of packets to a terminal, if it is determined that a data processing load of the data-driven processor can enter an overload state in which data processing is congested based on the current consumption of the data-driven processor.

The invention described in claim 2 is characterized in that the ultra-low-power data-driven networking processing device for avoiding overload of claim 1 may further includes an output control means for stopping output of relay packets, if it is determined that the data processing load of the data-driven processor is higher than a preset high-load state, based on the current consumption of the data-driven processor.

The invention described in claim 3 is characterized in that the ultra-low-power data-driven networking processing device for avoiding overload of claim 1 or 2 may further includes a voltage setting means for setting a voltage to be applied to the data-driven processor as a voltage depending on the data processing load of the data-driven processor, based on the current consumption of the data-driven processor; and a power control means for controlling the voltage to be applied to the data-driven processor, by using the voltage set in the voltage setting means, by controlling the power circuit.

The invention described in claim 4 is characterized in that the ultra-low-power data-driven networking processing device for avoiding overload of any of claims 1 to 3 may further includes a pipeline stage including a first merge unit for merging packets to be input to the data-driven processor with data processed by the data processing unit; the firing control unit for receiving packets or data transmitted from the first merge unit; a second merge unit for merging data transmitted from the firing control unit with data processed by the data processing unit; an instruction fetch unit for fetching an instruction based on data transmitted from the second merge unit; an instruction decode unit for interpreting the instruction transmitted from the instruction fetch unit; the data processing unit for processing the instruction interpreted by the instruction decode unit; a memory access unit for writing and reading data processed by the data processing unit to and from memory; a second branch unit for transmitting data to the second merge unit if the data corresponds to a unary operation and requires processing again by the data processing unit, based on data written by the memory access unit, and for transmitting the data to a downstream first branch unit if the data corresponds to a multi-input operation or does not require data processing by the data processing unit; and a first branch unit for transmitting data to the first merge unit if the data requires data processing again by the data processing unit based on the data transmitted from the second branch unit, and for outputting the data from the data-driven processor if the data does not require data processing by the data processing unit.

In order to accomplish the above object, an ultra-low-power data-driven networking processing device for avoiding overload according to the present invention according to claim 5 includes a data-driven processor including at least a firing control unit for determining whether firing conditions have been satisfied by determining whether all packets required to execute an instruction have been received, with respect to the packets that convey partitioned data to be processed, and a data processing unit for performing processing based on packets transmitted from the firing control unit if the firing conditions have been satisfied; a power circuit for supplying power to the data-driven processor; a current consumption detection means for detecting current consumption of the data-driven processor; a voltage setting means for setting a voltage to be applied to the data-driven processor as a voltage depending on a data processing load of the data-driven processor, based on the current consumption of the data-driven processor; and a power control means for controlling the voltage to be applied to the data-driven processor, by using the voltage set by the voltage setting means by controlling the power circuit.

In order to accomplish the above object, an ultra-low-power data-driven networking processing device for avoiding overload according to the present invention includes a data-driven processor including at least a firing control unit for determining whether firing conditions have been satisfied by determining whether all packets that convey partitioned data to be processed have been received, and a data processing unit for performing processing based on data transmitted from the firing control unit if the firing conditions have been satisfied; and a pipeline stage including a first merge unit for merging packets to be input to the data-driven processor with data processed by the data processing unit, the firing control unit for receiving packets or data transmitted from the first merge unit, a second merge unit for merging data transmitted from the firing control unit with data processed by the data processing unit, an instruction fetch unit for fetching an instruction based on data transmitted from the second merge unit, an instruction decode unit for interpreting the instruction transmitted from the instruction fetch unit, the data processing unit for processing the instruction interpreted by the instruction decode unit, a memory access unit for reading and writing data processed by the data processing unit from and to memory, a second branch unit for transmitting data to the second merge unit if the data corresponds to a unary operation and requires processing again by the data processing unit, based on data written by the memory access unit, and for transmitting the data to a downstream first branch unit if the data corresponds to a multi-input operation or does not require data processing in the data processing unit, and the first branch unit for transmitting data to the first merge unit if the data requires data processing again by the data processing unit, based on the data transmitted from the second branch unit, and for outputting the data from the data-driven processor if the data does not require data processing in the data processing unit.

Advantageous Effects

In accordance with the invention of claim 1, the overload may be avoided and the power consumption of a networking system may be reduced, compared with a configuration in which packets are accepted even in the case of an overload.

In accordance with the invention of claim 2, the traffic of the overall network may be suppressed and power consumption may be reduced via efficient processing, compared with a case where packets are relayed even in the case of an overload.

In accordance with the invention of claims 3 and 5, the voltage depending on the load of a data-driven processor may be applied, unnecessary power consumption may be reduced, and the power consumption of a networking system may be reduced, compared with a case where the voltage of a data-driven processor is not set based on current consumption.

In accordance with the invention, the processing time of a unary operation may be shortened and the power consumption of a networking system can also be reduced by decreasing an applied voltage while maintaining the processing time at time equal to that of the conventional technology or while improving the processing time, compared with a configuration without having a second merge unit and a second branch unit.

BRIEF DESCRIPTION

DETAILED DESCRIPTION

Hereinafter, detailed examples of an embodied form (hereinafter referred to as "embodiments") of the present invention will be described in detail with reference to the attached drawings, however the present invention is not limited to the following embodiments.

Below, in the description of the drawings, the illustration of parts other than elements required for description will be suitably omitted for easy understanding of the invention.

[Embodiment 1]

Figure 1:
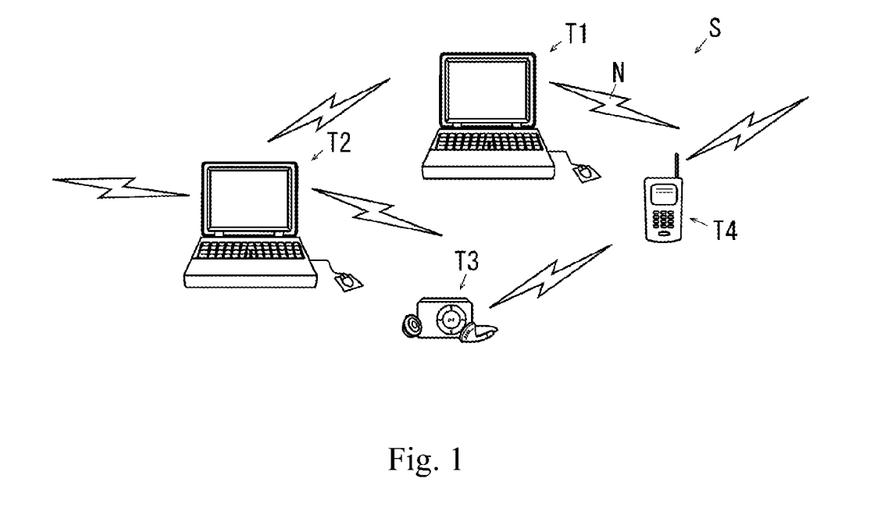
FIG. 1 is a diagram illustrating the overall configuration of embodiment 1 of a networking system according to the present invention.

FIG. 1 is a diagram showing the overall configuration of embodiment 1 of a networking system according to the present invention.

In FIG. 1, an ultra-low-power networking system S according to embodiment 1 of the present invention includes a plurality of terminals T1~T4. In the ultra-low-power networking system S according to embodiment 1, an autonomous decentralized communication network, so-called ad hoc network N formed via wireless communication of the terminals T1~T4, is employed, so that audio data or video data (for example, live broadcast video in the site of disaster or the like), which is an example of data, may be delivered in a streaming manner. Further, each of the terminals T1~T4 in embodiment 1 consists of an information processing device having an ad hoc network communication function (namely, PC: personal computer, a notebook PC, or a desktop PC), a mobile information terminal (namely, PDA: Personal Digital Assistant), a portable audio player, a mobile phone, or a portable game console having a communication function.

Figure 2:
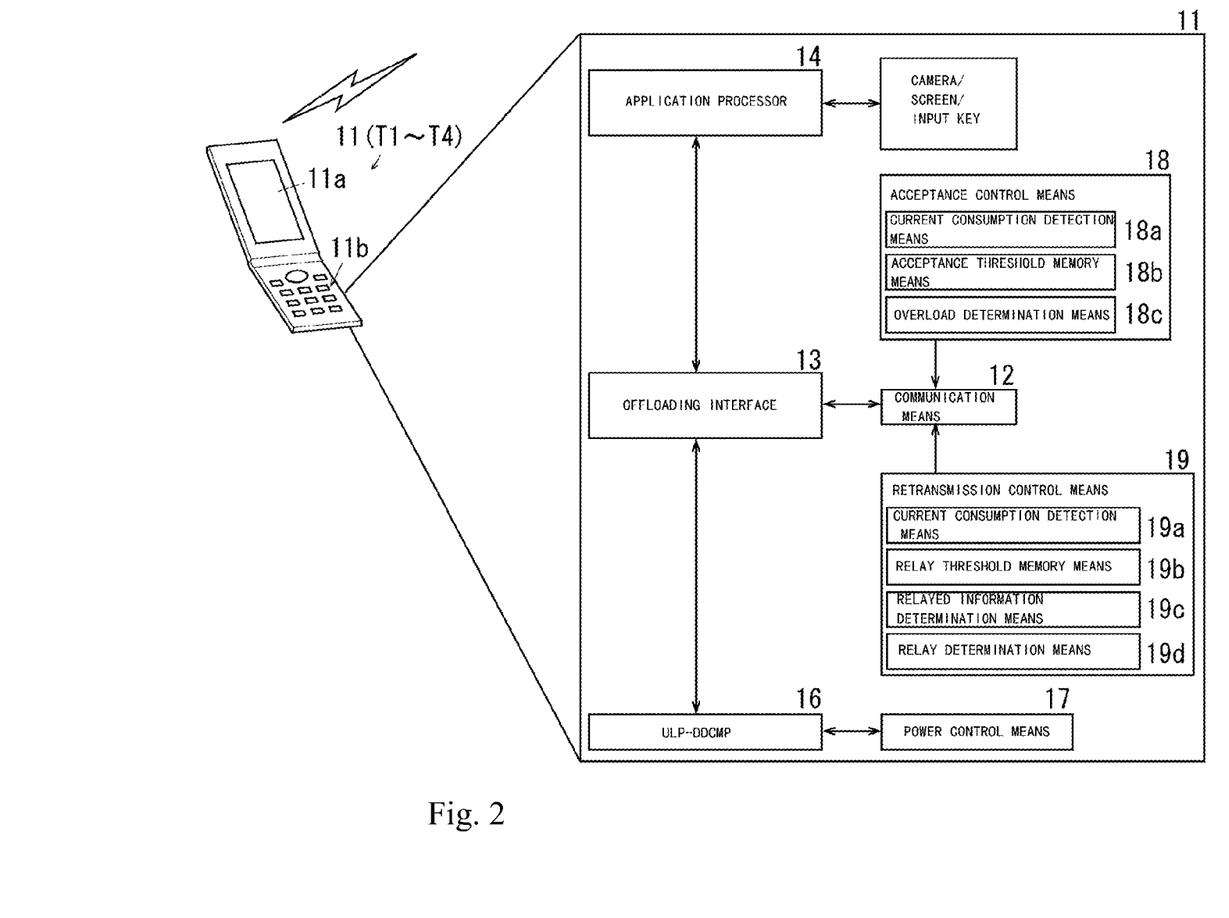
FIG. 2 is a diagram illustrating the function of a terminal, that is, a functional block diagram, according to embodiment 1.

FIG. 2 is a diagram illustrating the functions of the terminal, that is, a functional block diagram, according to embodiment 1.

FIG. 2 illustrates an example of each of terminals T1~T4 in embodiment 1, wherein a mobile phone 11 which is an embodiment of an ultra-low-power data-driven networking processing device for avoiding an overload includes a communication means 12 configured to transmit and receive data to and from other terminals T1~T4, an offloading interface 13 connected to the communication means 12 and configured to transmit and receive packets that convey partitioned data, an application processor 14 electrically connected to the offloading interface 13 and configured to control a camera contained in the mobile phone 11 or display screen 11a or to process input from input keys 11b, etc., a chip multiprocessor 16 electrically connected to the offloading interface 13 and configured to perform data processing such as communication processing, and a power control means 17 configured to control the supply of power to the chip multiprocessor 16. Further, in the mobile phone 11 according to embodiment 1, control signals from an acceptance control means 18, which is an example of an overload avoidance means, and a relay control means 19, which is an example of an output control means, are input to the communication means 12.

Further, in embodiment 1, the chip multiprocessor 16 consists of an Ultra-Low-Power Data-Driven Chip Multiprocessor (ULP-DDCMP). Furthermore, the chip multiprocessor 16 in embodiment 1 processes User Datagram Protocol/Internet Protocol (UDP/IP) which is an example of a communication protocol, but the protocol is not limited thereto, conventional known communication protocols (e.g., TCP/IP: Transmission Control Protocol/Internet Protocol) or the like may be used.

Figure 3:
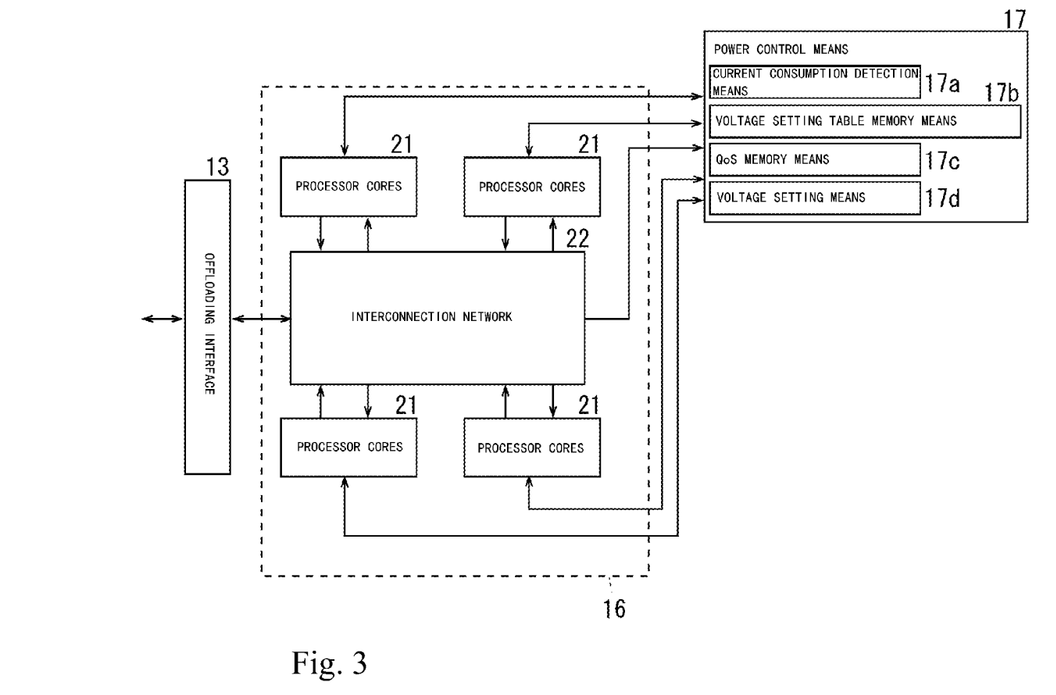
FIG. 3 is a functional block diagram showing a chip multiprocessor according to embodiment 1.

FIG. 3 is a functional block diagram showing the chip multiprocessor according to embodiment 1.

In FIG. 3, the chip multiprocessor 16 in embodiment 1 includes a processor cores 21 and a inter-core connection network (interconnection network) 22, the aforementioned processor cores 21 consists of a data-driven processor, and the aforementioned inter-core connection network 22 is an example of a means for interconnecting individual cores with the other processor cores and performing transmission and reception of information among the processor cores 21. The interconnection network 22 in embodiment 1 is realized by a token router which is transferring packets transmitted and received to and from each processor core 21 to a packet destination.

Figure 4:
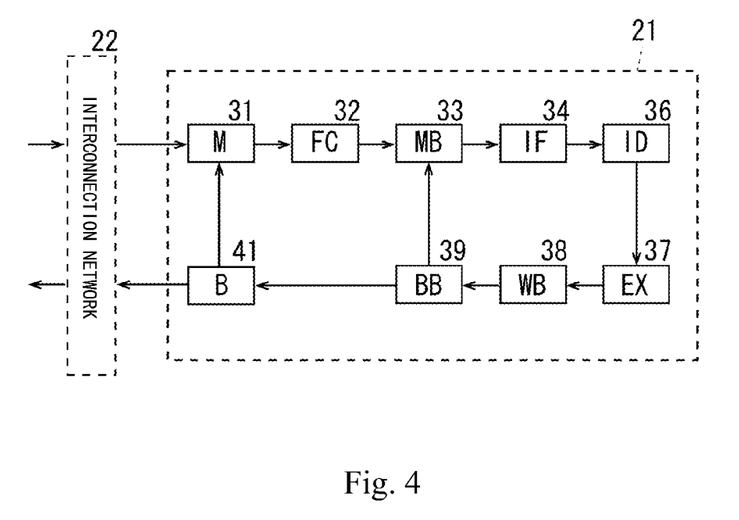
FIG. 4 is a diagram illustrating the architecture of a data-driven processor according to embodiment 1 and is a functional block diagram.

FIG. 4 is a diagram illustrating the architecture of the data-driven processor of embodiment 1, and is a functional block diagram.

In the diagram illustrating the architecture of each processor core 21 of embodiment 1, shown in FIG. 4, the processor core 21 in embodiment 1 has a so-called circular pipeline structure.

In the circular pipeline structure, packets output from the interconnection network 22 are input to a first merge unit (M) 31.

The packets input to the first merge unit 31 are transmitted to a firing control unit (FC) 32, and the firing control unit 32 determines whether firing conditions have been satisfied by determining whether all packets required to execute an instruction have been received.

If the firing conditions have been satisfied in the firing control unit 32, data is transmitted to a second merge unit (MB: Merge for Bypass) 33.

The packets input to the second merge unit 33 are input to an instruction fetch unit (IF) 34, then the instruction fetch unit (IF) 34 fetches the instruction of the input packets, that is, reads out the instruction.

The packets processed by the instruction fetch unit 34 are input to an instruction decode unit (ID) 36, which interprets the instruction and generates a control signal.

For the packets processed by the instruction decode unit 36, the instruction of the packets is processed by a data processing unit (execution unit, EX) 37.

The packets processed by the data processing unit 37 are used to write to and read from memory (register) by a memory access unit (MA: Memory Access/WB: Write Back) 38.

A second branch unit (BB: Branch for Bypass) 39 determines whether the data processed by the memory access unit 38 is the target of a unary operation or the target of a multi-input operation. If the data is the target of the unary operation and requires data processing again by the data processing unit 37 (for example, when, in n-repetitive data processing, over-all data processing is not completed), the data is transmitted to the second merge unit 33. Further, in embodiment 1, identification information required to determine whether data is the target of a unary operation or a multi-input operation is added to the header of each packet, so that if identification information of '0' is set to the unary operation and '1' is set to the multi-input operation, it can be determined whether or not the data corresponds to the unary operation based on the 1-bit identification information. Further, representative examples of the unary operation may include operation processing having a single input variable, such as increment (processing of adding +1 to variable n) or decrement (processing of subtracting −1 from variable n), and involution or power, etc., and representative examples of the multi-input operation include operation processing having two or more input variables, such as n+m or n−m performed on two input values (n, m).

A first branch unit (B) 41 determines whether packets that are not transmitted from the second branch unit 39 to the second merge unit 33 are the data of a multi-input operation required data processing again or not. If the data processing by the processor core 21 is completed, the packets are transmitted from the processor core 21 to the interconnection network 22, and if data processing is required, the packets are transmitted to the first merge unit 31.

That is, in the processor core 21 of embodiment 1, the second merge unit 33 and the second branch unit 39 which were not provided in a conventional data-driven processor are provided, and the unary operation is processing by the instruction fetch unit 34 without using the firing control unit 32.

Figure 5:
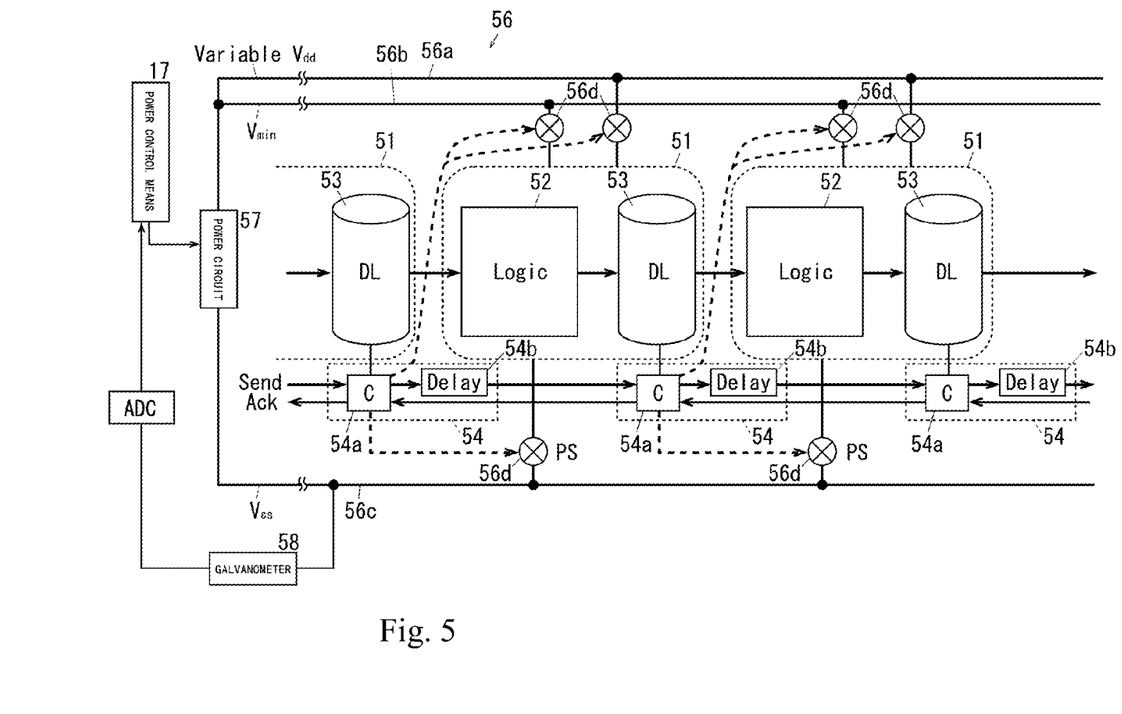
FIG. 5 is a diagram illustrating the implementation of the data-driven processor on a circuit according to embodiment 1, and is a diagram illustrating a self-timed elastic pipeline.

FIG. 5 is a diagram illustrating the implementation of the data-driven processor on a circuit according to embodiment 1, and is a diagram illustrating a self-timed elastic pipeline.

In FIG. 5, each processor core 21 in embodiment 1 has a pipeline structure based on a self-timed elastic pipeline. The processor core 21 in embodiment 1 includes a plurality of pipeline stages 51 corresponding to pipeline stages 31~41 on the functional block (on architecture) such as the firing control unit 32.

In FIG. 5, each pipeline stage 51 includes a logic circuit (LC) 52 configured to realize the processing of the corresponding pipeline stage 51 based on packets transmitted from an upstream pipeline stage 51 according to the flow of packets; a data latch (DL) 53 connected to the logic circuit 52 and configured to maintain the packets processed by the logic circuit 52; and a Self-timed transfer control mechanism (STCM) 54 configured to provide a synchronization signal (clock signal and trigger signal) to the data latch 53.

Further, the self-timed transfer control mechanism 54 in embodiment 1 is configured in a way similar to that of Patent document 3 (Japanese Patent Application Publication No. 2010-20598), and includes a coincidence element (C) 54*a* which is an example of a data transfer control circuit formed in correspondence with each data latch 53, and a delay element 54*b* for guaranteeing packet processing time taken by each logic circuit 52. Further, the behavior and control of the self-timed transfer control mechanism 54 according to embodiment 1 are known as described in Patent document 3 (Japanese Patent Application Publication No. 2010-20598), and thus a detailed description thereof will be omitted. Furthermore, a configuration in which the self-timed transfer control mechanism 54 is employed even in the interconnection network 22 is also identical to Patent document 3, and thus a detailed description thereof will be omitted.

A power supply line 56 for supplying a drive voltage for operation is connected to the logic circuit 52 and the data latch 53. The power supply line 56 includes a drive voltage line 56*a* for supplying a drive voltage (positive voltage, drain voltage, and drive power) Vdd which is required to execute processing in the logic circuit 52; a minimum voltage line 56b for supplying a minimum voltage (minimum power and data maintenance power) Vmin which is sufficient to maintain packet data by the data latch 53 when the logic circuit 52 does not execute processing, and which is lower than the drive voltage Vdd; and a negative voltage line 56c for supplying a negative voltage (source voltage, reference voltage, for example, ground: earth) Vss, where on the respective voltage lines 56a-56c, power switches PS 56d which are examples of a switch device for switching the connection and disconnection of the supply of voltage are provided for each of the pipeline stages 11. That is, by controlling the power switches 56d, the drive voltage Vdd or the minimum voltage Vmin may be supplied to each logic circuit 52 and each data latch 53, or the supply of the voltage may be switched off. A power circuit 57 is connected to the power supply line 56 to supply each of the voltages Vdd, Vmin, Vss. Further, the power control means 17 is connected to the power circuit 57, so that the drive voltage Vdd is controlled to a variable voltage value by the power control means 17.

A galvanometer 58 is connected to the power supply line 56, so that the current consumption Iss of the power supply line is detected by the current consumption detection means 17a of the power control means 17 via an Analog to Digital Converter (ADC)(not shown). Further, in embodiment 1, the current consumption Iss of each processor core 21 is detected by the power control means 17.

The power control means 17 in embodiment 1 includes a QoS setting memory means 17b, which memorizes the setting of a Quality of Service (QoS). The QoS setting memory means 17b in embodiment 1 memorizes information about whether processing performed by the processor core 21 is corresponding to 'power saving priority' which assigns priority to power saving even if processing speed is decreased, or 'speed priority' that assigns priority to processing speed rather than power saving. Furthermore, in embodiment 1, the setting of QoS is configured such that the QoS can be set and varied by the application processor 14 of the terminal 11 or by the processor core 21.

Figure 6:
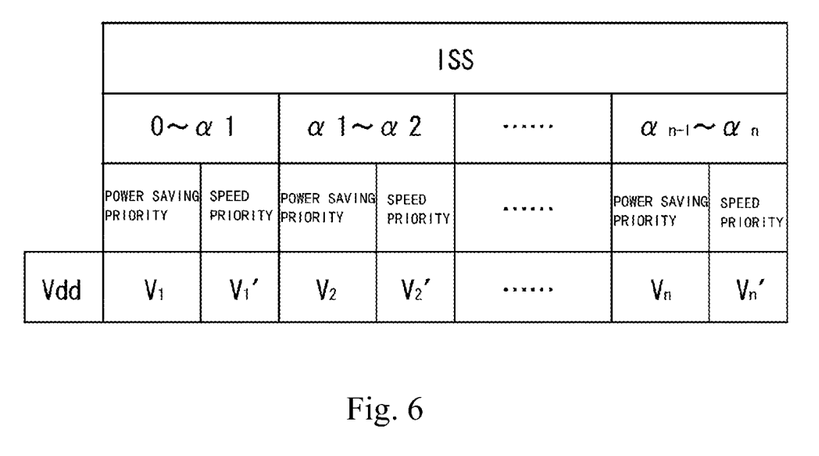
FIG. 6 is a diagram illustrating an example of a voltage setting table according to embodiment 1.

FIG. 6 is a diagram illustrating an example of a voltage setting table according to embodiment 1.

The voltage setting table memory means 17c of the power control means 17 memorizes a voltage setting table referred to when the drive voltage Vdd applied to the processor core 21 is set based on current consumption Iss. In the voltage setting table, optimal drive voltages Vdd corresponding to current consumption Iss and QoS values have been derived and selected in advance using experiments or the like, and relationships between the current consumption Iss and the drive voltage Vdd are memorized in the form of a table. In FIG. 6, when current consumption Iss is greater than 0 and equal to or less than a preset threshold $\alpha 1$, V1 is set as the drive voltage Vdd in the case of 'power saving priority' and V1'(>V1) is set as the drive voltage Vdd in the case of 'speed priority.' In the similar manner, when current consumption Iss is $\alpha 1 \sim \alpha 2$, V2(>V1') is set as the drive voltage in the case of 'power saving priority' and V2'(>V2) is set as the drive voltage in the case of 'speed priority.'

In FIG. 5, the voltage setting means 17d of the power control means 17 sets the drive voltage Vdd to a voltage value depending on the load (processing capability, throughput) of data processing by the processor core 21 based on the current consumption Iss. In detail, the voltage setting means 17 in embodiment 1 sets the drive voltage Vdd with reference to the voltage setting table memorized in the voltage setting table memory means 17c, on the basis of the current consumption Iss obtained by the current consumption detection means 17a and the settings of QoS memorized in the QoS memory means 17b.

Further, when the drive voltage Vdd is set by the voltage setting means 17d, the voltage control means 17 in embodiment 1 controls the power circuit 57 in a direction from a current drive voltage to a set target voltage Vdd so that the current drive voltage is focused on the target drive voltage Vdd through Proportional Integral Differential (PID) control which is an example of feedback control.

(Description of Acceptance Control Means)

In FIG. 2, the acceptance control means 18 according to embodiment 1 includes a current consumption detection means 18a configured in the same manner as that of the current consumption detection means 17a, an acceptance threshold memory means 18b, and an overload determination means 18c.

The acceptance threshold memory means 18b memorizes a threshold I1 for determining whether to accept or deny the input of packets from the offloading interface 13. The threshold I1 in embodiment 1 is set in such a way that current consumption Iss, of which the load of each processor core 21 is overloaded, is measured in advance through experiments or the like.

The overload determination means 18c according to embodiment 1 is configured in such a way that a function for specifying relationships between current consumption Iss and a data processing load is derived in advance through experiments or the like, and thus it is determined whether data processing may enter an overload state when packets are input based on the current consumption Iss. The overload determination means 18c in embodiment 1 determines whether data processing will enter an overload state when accepting the packets based on the current consumption Iss acquired by the current consumption detection means 18a. In detail, it is determined whether the current consumption Iss will be equal to or greater than the acceptance threshold I1, that is, whether Iss≥I1 is satisfied. If the current consumption Iss will be equal to or greater than the acceptance threshold I1, it is determined that data processing will enter the overload state. If it is determined by the overload determination means 18c that the overload state is entered, the reception of packets in the communication means 12 is stopped by the acceptance control means 18 according to embodiment 1, and packets transmitted to the terminals T1~T4 are ignored.

(Description of Relay Control Means)

The relay control means 19 includes a current consumption detection means 19a configured in the same manner as that of the current consumption detection means 17a, a relay threshold memory means 19b, a relayed information determination means 19c, and a relay determination means 19d. The relay control means 19 controls to stop the relay of packets, when determined it is in a high load state.

The relay threshold memory means 19b memorizes a threshold I2 required to determine whether to retransmit packets based on the current consumption. The threshold I2 according to embodiment 1 is set in such a way that current consumption Iss, of which the load of chip multiprocessor 16 is in a high-load state, is measured in advance through experiments or the like. That is, the threshold I2 which determines whether the mobile phone 11 as a node is in a high-load state is memorized.

The relayed information determination means 19c determines whether each packet is to be relayed information. Further, the determination of whether a packet is relayed may be performed by various conventional known configurations, for example, referring to ID for specifying data included in the header of the packet, or checking from initiation node ID or message ID as described in Patent document 4. Thus a detailed description thereof will be omitted.

The relay determination means 19d determines whether to perform relay based on the current consumption Iss. The relay determination means 19d according to embodiment 1 determines if the output packet is relayed information, and determines a node is in a high-load state when the sum of current consumption values Iss is greater than the threshold I2, based on the current consumption Iss obtained by the current consumption detection means 19a, the threshold I2 memorized in the relay threshold memory means 19b, and the results of the determination by the relayed information determination means 19c, and then stops and suppresses the relay of packets. Further, methods of stopping and suppressing relay may be implemented by using current consumption Iss, instead of the number of packets, in LDPF (Load aware Dynamic Probabilistic Flooding) and LDCF (Load aware Dynamic Counter-based Flooding) methods based on the number of packets, described in Patent document 4. Further, since the LDPF and LDCF methods are described in Patent document 4, and are well known in the art, a detailed description thereof will be omitted.

(Operation of Embodiment 1)

Since the ultra-low-power networking system S according to embodiment 1 having the above configuration employs an ad hoc network N, servers or the like are not required in wireless communication between terminals T1~T4, compared with a network requiring infrastructures wherein power consumption is increased because of such as servers or access points in which power is always consumed in large scale. Therefore, low-power consumption may be realized. Further, since the ultra-low-power networking system S according to embodiment 1 includes the data-driven processor core 21, and performs processing based on received packets only when the packets are received, thus power consumption is reduced compare with a processor which always waits for the reception of packets with power consuming.

Furthermore, the networking system S according to embodiment 1 denies the acceptance of packets via the acceptance control means 18 or the like before the processing of the processor core 21 which is the data-driven processor is in an overload state. Therefore, the processing overload of the processor core 21 may be avoided, the congestion of processing may be avoided, and power required to memorize packets may be reduced compared with a conventional configuration in which waiting packets for processing are accepted and memorized. Thus power may be saved. Further, in the networking system S according to embodiment 1, the acceptance of packets is denied before an overload state is made, so that the margin of a load on the processor core 21 may be reduced to a limit and overhead may be minimized, and thus efficiency may be improved. Therefore, compared with technology which needs to secure a margin to prevent an overload, as described in Patent document 4, information throughput may be increased at the same power consumption, with the result that power consumption per unit information amount may be reduced.

Furthermore, in the networking system S according to embodiment 1, when the same information is output, output is suppressed by the relay control means 19 or the like based on the current consumption each node is in a high-load state. Therefore, inefficient processing causing repetitive information to be relayed to another node several times may be suppressed, thus traffic of the network N may be reduced. Therefore, in simple flooding, it is difficult to cause information to reach all nodes even while using high power, due to causes such as a collision among pieces of information, but in embodiment 1 in which unnecessary repetitive relay is reduced and traffic is decreased, thus it is possible to transmit information to as many nodes as possible.

Specifically, in embodiment 1, the suppression of relay is controlled based on the current consumption Iss. That is, as described in Patent document 3, the data-driven processor implemented in the self-timed elastic pipeline has a strong correlation between the throughput (processing speed, throughput per unit time, load) of the processor core 21 and current consumption, specifically, has a proportional relation. The reason for this is that only a pipeline stage in which valid data is present is driven in the data-driven processor implemented by the self-timed elastic pipeline. Therefore, if current consumption is measured from the outside of the data-driven processor, the load of the inside of the data-driven processor may be observed. That is, observability is provided. In comparison with this, as in the case of technology described in Patent document 4, when a load is determined based on the number of packets, the time required for processing varies according to the size of data fragmented into packets, and thus a correlation with the processing load is not as strong as a correlation with power consumption. Therefore, technology described in Patent document 4 for determining a load based on the number of packets has a limitation in the accuracy of load determination, whereas the networking system S in embodiment 1 determines a load based on current consumption, so that accuracy is improved, thus enabling more efficient processing to be performed. Therefore, compared with Patent document 4, it is possible to send information to more nodes while reducing power consumption through efficient processing.

Further, in the networking system S according to embodiment 1, drive voltage Vdd is changed based on current consumption based on load, and power consumption depending on the load is realized, thereby unnecessary power consumption may be reduced. This is based on the controllability of the self-timed elastic pipeline for implementing the data-driven processor. That is, in the implementation of the self-timed elastic pipeline, a special circuit such as a PLL (Phase-Locked Loop) is not required, and the self-timed elastic pipeline is implemented using only standard logic gates, thereby enabling a delay in the circuit to vary at the same rate as that of a variation in the drive voltage Vdd. Therefore, the operating speed of the circuit varies only by varying the drive voltage Vdd, consequently, throughput may be controlled.

Specifically, throughput (the amount of data processed per unit time) is proportional to the drive voltage Vdd, and power consumption is proportional to the square of the drive voltage Vdd that is an supplied voltage. Therefore, in the data-driven processor implemented using the self-timed elastic pipeline, when throughput per unit time is low, for example, if the drive voltage Vdd is reduced to $\frac{1}{2}$, power consumption is $(\frac{1}{2})^2=\frac{1}{4}$ of Vdd, and thus power saving may be efficiently conducted. That is, if the minimum Vdd required to achieve throughput needed by targeted processing is applied to the data-driven processor implemented using the self-timed elastic pipeline in which only a pipeline having valid data is driven, ultra-low-power consumption may be accomplished to consume the power essentially required for targeted processing only. Moreover, in embodiment 1, the acceptance of packets is controlled so that an overload does not occur, excessive power consumption is reduced, and then power saving is promoted compared with the case of overloading.

Furthermore, in the pipeline structure of the networking system S according to embodiment 1, data is transmitted from the second branch unit 39 to the second merge unit 33 and a so-called bypass is formed, in the case of a unary operation. Therefore, compared with the conventional pipeline structure using the firing control unit 32, the number of pipeline stages may be reduced by a portion occupied by the firing control unit 32. That is, in a unary operation, since there is an input variable, the firing control unit 32 does not need to wait for a second input variable to be input as in the case of a multi-input operation, thereby transmitting the variable to the instruction fetch unit 34, and the stage of the firing control unit 32 may be omitted. Specifically, in examples of a UDP/IP processing program, about 88% of operations are unary operations. Even if, in the multi-input operations corresponding to the remaining portion of about 12%, two stages corresponding to the second merge unit 33 and the second branch unit 39 are increased, the pipeline stage of the firing control unit 32 may be bypassed in the processing of 88%, and as a result, processing may be performed totally at high speed.

Therefore, since processing time may be shortened at the same drive voltage Vdd compared with conventional configuration, the drive voltage Vdd may be reduced if the same processing time as that of the conventional processing is given. Therefore, in the networking system according to embodiment 1, the drive voltage Vdd may be reduced while processing speed identical to conventional speed is maintained, and thus power consumption may be reduced.

(Modification Examples)

Hereinbefore, although the embodiment of the present invention has been described in detail, the present invention is not limited to the above embodiment and various modifications are possible without departing from the scope of the gist of the present invention as disclosed in the accompanying claims. Modification Examples (H01) to (H07) of the present invention will be exemplified below.

(H01) As described in the above embodiment, although a configuration in which the self-time elastic pipeline having power switches is employed in the processor core 21 or the interconnection network 22 has been exemplified, the present invention is not limited thereto, and it is preferable that the application processor 14 or the offloading interface 13 employ the self-timed elastic pipeline as well as the processor core 21 or the like. Further, when a data-driven processor is used as the application processor 14, the same as the processor core 21, the data-driven processor can be connected to the interconnection network 22, and thus the offloading interface 13 may be omitted.

(H02) In the above embodiment, although the power switches have been respectively provided for the pipeline stages 51, the present invention is not limited to this configuration, and it is also possible to integrate a plurality of pipeline stages into a single cluster and provide a power switch for each cluster or to install and control power switches in the unit of a processor or the unit of a processor cluster (processor set).

(H03) In the above embodiment, although the autonomous decentralized communication network based on wireless communication has been illustrated as a network, the present invention is not limited to this configuration, and it is also possible to implement an autonomous decentralized communication network among terminals connected in a wired manner as the network. Further, from the standpoint of low power consumption, it is preferable to set the autonomous decentralized communication network, but it is also possible to set a communication network other than the autonomous decentralized communication network as the network.

(H04) In the above embodiment, although an embodiment for varying the drive voltage Vdd has been illustrated, the present invention is not limited to this configuration, for example, and it is also possible to control the processing speed and power consumption of the logic circuit of each pipeline stage by controlling a bias voltage on the substrate of CMOS transistors constituting each pipeline stage. Further, even at a constant drive voltage Vdd, there is an effect of low power consumption rather than conventional technology, thus the drive voltage Vdd may be set to a fixed value owing to the denial of acceptance of packets in the case of an overload or a bypass in a unary operation.

(H05) In the above embodiment, although it is preferable to deny the acceptance of packets or suppress the relay of packets, the effect of low power consumption may be obtained via the control of the drive voltage Vdd or the bypass in the unary operation, and thus it is also possible to implement a configuration in which the denial of acceptance or the like is not executed.

(H06) In the above embodiment, although it is preferable to employ a bypass in a unary operation, it is also possible to implement a configuration without employing a bypass because the effect of low power consumption is obtained by the denial of packet acceptance, the suppression of relay, or the control of the drive voltage Vdd when multi-input operations more than unary operations are present in data to be processed, or when a large amount of data having a shorter processing time without a bypass are handled.

(H07) In the embodiment, although the configuration of the chip multiprocessor having a plurality of processor cores 21 has been illustrated, the present invention is not limited to this configuration, and it is also possible to configure a processor having only a processor core 21.

Mode for Invention

Industrial Applicability

It may be expected that when data communication must be guaranteed regardless of whether the intervention of a person is present, the above-described present invention can implement the communication infrastructure of a machine-to-machine (M2M) network.

Therefore, in case of an emergency making it impossible to use communication infrastructures where natural disasters occur, such as an earthquake, volcanic eruption, tornado, etc., or large-scale accidents or incidents such as aircraft accidents or the accidents of power plants, an ad hoc network using mobile phones or smart phones may be constructed and may be used as a communication means in an emergency, and thus the improvement of a lifesaving rate or the reduction of damage by disasters may be expected.

Further, data communication required for industry, disaster prevention, countermeasures against disasters, and crime prevention may be automatically and promptly realized among machines. For example, the configuration of the present invention is inserted into a guidance signboard, a fire extinguishment facility, etc., so that when disaster monitoring is performed by a user's mobile phone, a network is constructed together with the guidance signboard or the fire extinguishment facility, and thus a configuration in which a broadcast for a refuge path or the like (digital signage) may be delivered via the guidance signboard or in which the fire extinguishment facility or the like is automatically operated may be predicted. Furthermore, an M2M network guaranteeing data communication may exhibit its quality in places where the entrance of persons is difficult. In places where the entrance of persons is difficult, for example, low-temperature areas, the outer walls of a high building, underwater area, the ocean floor, and polar regions, high-temperature areas such as power plants or the furnaces of steelworks, or high-humidity places, it is difficult to change batteries or supply power in a wired manner, thus limiting long-term use of appliances having high power consumption. In contrast, even in places where the entrance of persons is difficult, the operation of appliances may be expected even if the self-supply of relative small capacity power such as photovoltaic power generation or the supply of small-capacity power via space power transmission is performed. Further, highly reliable data communication may be achieved by avoiding an overload state causing congestion. Furthermore, for example, a sensor network enabling communication and broadcasting may avoid the overload state thereof and may be constructed at low power consumption to collect environmental information (temperature, humidity, visual/auditory information of a user, and location information).

Furthermore, with the economic development of developing countries in the future, it is anticipated that an international energy crisis will approach, and at this time, the implementation of ultra-low-power consumption technology according to the present invention is expected to contribute to overcoming such energy crisis.

Furthermore, in countries or regions such as depopulated regions or developing countries in which equipment such as communication means for emergency use (wireless disaster prevention facilities) is not sufficiently provided, it may be expected that a network enabling rescue connection or safety information to be first communicated in an emergency may be constructed by deploying mobile phones or routers having an ad hoc mode.

<Description of the Reference Numerals>

| | |
|---|---|
| 17d: voltage setting means | 17: power control means |
| 18: overload control means | 19: output control means |
| 21: data-driven processor | 31: first merge unit |
| 31~41, 51: pipeline stage | 32: firing control unit |
| 33: second merge unit | 34: instruction fetch unit |
| 36: instruction decode unit | 37: data processing unit |
| 38: memory access unit | 39: second branch unit |
| 41: first branch unit | 57: power circuit |
| Iss: current consumption | S: networking system |
| Vdd: voltage | |

The invention claimed is:

1. An ultra-low-power data-driven networking processing device for avoiding overload, comprising:
 a data-driven processor including at least a firing control device for determining whether firing conditions have been satisfied by determining whether all packets required to execute an instruction have been received, with respect to packets that convey partitioned data to be processed, and a data processing device for performing processing based on packets transmitted from the firing control device if the firing conditions have been satisfied;
 a power circuit for supplying power to the data-driven processor;
 an interface for denying input of packets to a terminal, if it is determined that a data processing load of the data-driven processor can enter an overload state in which data processing is congested, based on current consumption of the data-driven processor; and
 a pipeline stage including a first merge device for merging packets to be input to the data-driven processor with data processed by the data processing device, the firing control device for receiving packets or data transmitted from the first merge device, a second merge device for merging data transmitted from the firing control device with data processed by the data processing device, an instruction fetch device for fetching an instruction based on data transmitted from the second merge device, an instruction decode device for interpreting the instruction transmitted from the instruction fetch device, the data processing device for processing the instruction interpreted by the instruction decode device, a memory access device for reading and writing data processed by the data processing device from and to memory, a second branch device for transmitting data to the second merge device if, based on data written by the memory access device, the data corresponds to a unary operation and requires processing again by the data processing device, and for transmitting the data to a downstream first branch device if the data corresponds to a multi-input operation and does not require data processing by the data processing device, and the first branch device for transmitting data to the first merge device if, based on the data transmitted from the second branch device, the data requires data processing again by the data processing device, and for outputting the device from the data-driven processor if the data does not require data processing by the data processing device.

2. The ultra-low-power data-driven networking processing device for avoiding overload of claim 1, further comprising an output control means interface for stopping output of relay packets, if it is determined that the data processing load of the data-driven processor is higher than a preset high-load state, based on the current consumption of the data-driven processor.

3. The ultra-low-power data-driven networking processing device for avoiding overload of claim 1, further comprising:
 power circuit for supplying the data-driven processor as a voltage depending on the data processing load of the date-driven processor, based on the current consumption of the data-driven processor.

4. An ultra-low-power data-driven networking processing device for avoiding overload, comprising:
 a data-driven processor including at least a firing control device for determining whether firing conditions have been satisfied by determining whether all packets required to execute an instruction have been received, with respect to the packets that convey partitioned data to be processed, and a data processing device for performing processing based on packets transmitted from the firing control unit device if the firing conditions have been satisfied;
 galvanometer for detecting current consumption of the data-driven processor;
 power circuit for supplying the data-driven processor as a voltage depending on a data processing load of the data-driven processor, based on current consumption of the data-driven processor; and
 a pipeline stage including a first merge device for merging packets to be input to the data-driven processor with data processed by the data processing device, the firing control device for receiving packets or data transmitted from the first merge device, a second merge device for merging data transmitted from the firing control device with data processed by the data processing device, an instruction fetch device for fetching an instruction based on data transmitted from the second merge device, an instruction decode device for interpreting the instruction transmitted from the instruction fetch device, the data processing device for processing the instruction interpreted by the instruction decode device, a memory access device for reading and writing data processed by the data processing device from and to memory, a second branch device for transmitting data to the second merge device if, based on data written by the memory access device, the data corresponds to a unary operation and requires processing again by the data processing device, and for transmitting the data to a downstream first branch device if the data corresponds to a multi-input operation and does not require data processing by the data processing device, and the first branch device for transmitting data to the first merge device if, based on the data transmitted from the second branch device, the data requires data processing again by the data processing device, and for outputting the data from the data-driven processor if the data does not require data processing by the data processing device.

5. An ultra-low-power data-driven networking processing device for avoiding overload, comprising:
 a data-driven processor including at least a firing control device for determining whether firing conditions have been satisfied by determining whether all packets that convey partitioned data to be processed have been received, and a data processing device for performing processing based on data transmitted from the firing control device if the firing conditions have been satisfied; and
 a pipeline stage including a first merge device for merging packets to be input to the data-driven processor with data processed by the data processing device, the firing control device for receiving packets or data transmitted from the first merge device, a second merge device for merging data transmitted from the firing control device with data processed by the data processing device an instruction fetch device for fetching an instruction based on data transmitted from the second merge device, an instruction decode device for interpreting the instruction transmitted from the instruction fetch device the data processing unit device for processing the instruction interpreted by the instruction decode device, a memory access unit device for reading and writing data processed by the data processing unit device from and to memory, a second branch device for transmitting data to the second merge unit device if the data corresponds to a unary operation and requires processing again by the data processing device, based on data written by the memory access device, and for transmitting the data to a downstream first branch device if the data corresponds to a multi-input operation or does not require data processing in the data processing device, and the first branch device for transmitting data to the first merge device if the data requires data processing again by the data processing device, based on the data transmitted from the second branch device, and for outputting the data from the data-driven processor if the data does not require data processing in the data processing device.

* * * * *